United States Patent Office 2,831,010
Patented Apr. 15, 1958

2,831,010

PHENYLVINYLMETHYLTRISILOXANES

Harold A. Clark and Loren A. Haluska, Midland, Mich., assignors to Dow Corning Corporation, Midland, Mich., a corporation of Michigan No Drawing. Application April 12, 1956
Serial No. 577,632

3 Claims. (Cl. 260—448.2)

This invention relates to novel organotrisiloxanes.
It is the object of this invention to provide novel compositions of matter which are useful as dielectric fluids, lubricants and as diluents in the preparation of casting resins.
This invention relates to siloxanes of the formula $$ViMe_2SiOSiOSiMe_2Vi$$
$$\underset{R}{\overset{Ph}{|}}$$

in which R is a methyl or phenyl radical.

The above trisiloxanes can be prepared by cohydrolysis of the corresponding chlorosilanes in the conventional manner for preparing such siloxanes. In general it is preferable to add the mixed chlorosilanes to water at about room temperature. The resulting cohydrolyzate is then separated from the acid layer and then distilled to obtain the compositions of this invention.

The compositions of this invention are low viscosity fluids which are particularly useful as diluents for phenylvinylpolysiloxane resins such as those disclosed in U. S. Patent 2,714,099. The diluted resins are particularly useful in preparing castings, and due to their lower viscosity are much more applicable for impregnation of intricate structures than the aforesaid undiluted resins. The utility of the trisiloxanes of this invention for use as diluents is particularly shown in the copending application of Harold A. Clark, Serial No. 577,672, filed concurrently herewith and now abandoned, entitled "Siloxane Casting Resins," the disclosure of which is made a part of this application by reference.

The following examples are illustrative of the compositions of this invention. The abbreviation Vi stands for vinyl, Me for methyl and Ph for phenyl.

*Example 1*

One mol of diphenyldichlorosilane and 2.5 mols of dimethylvinylchlorosilane were mixed and added to 180 g. of water over a period of 1 hour. The mixture was stirred for 7 hours, then washed free of acid. The hydrolyzate was distilled to give the compound $$ViMe_2SiOSiOSiMe_2Vi$$
$$\underset{}{\overset{Ph_2}{|}}$$

boiling 141–143° C. at 1 mm.

*Example 2*

A mixture of 9 mols of phenylmethyldichlorosilane and 18 mols of vinyldimethylchlorosilane was added slowly to water at room temperature. The hydrolyzate was washed free of acid and distilled to give the composition $$ViMe_2SiOSiOSiMe_2Vi$$
$$\underset{Me}{\overset{Ph}{|}}$$

boiling at 117–118° C. at 5 mm.

That which is claimed is:
1. A composition of the formula $$ViMe_2SiOSiOSiMe_2Vi$$
$$\underset{R}{\overset{Ph}{|}}$$

in which R is selected from the group consisting of methyl and phenyl radicals.

2. A composition of the formula $$ViMe_2SiOSiOSiMe_2Vi$$
$$\underset{}{\overset{Ph_2}{|}}$$

3. A composition of the formula $$ViMe_2SiOSiOSiMe_2Vi$$
$$\underset{Me}{\overset{Ph}{|}}$$

References Cited in the file of this patent

UNITED STATES PATENTS

| | | |
|---|---|---|
| 2,410,346 | Hyde | Oct. 29, 1946 |
| 2,469,888 | Patnode | May 10, 1949 |
| 2,604,487 | Burkhard | July 22, 1952 |
| 2,714,099 | Weyenberg | July 26, 1955 |